(No Model.) 2 Sheets—Sheet 1.
W. H. ATKINSON.
FISHING REEL ATTACHMENT.
No. 442,302. Patented Dec. 9, 1890.
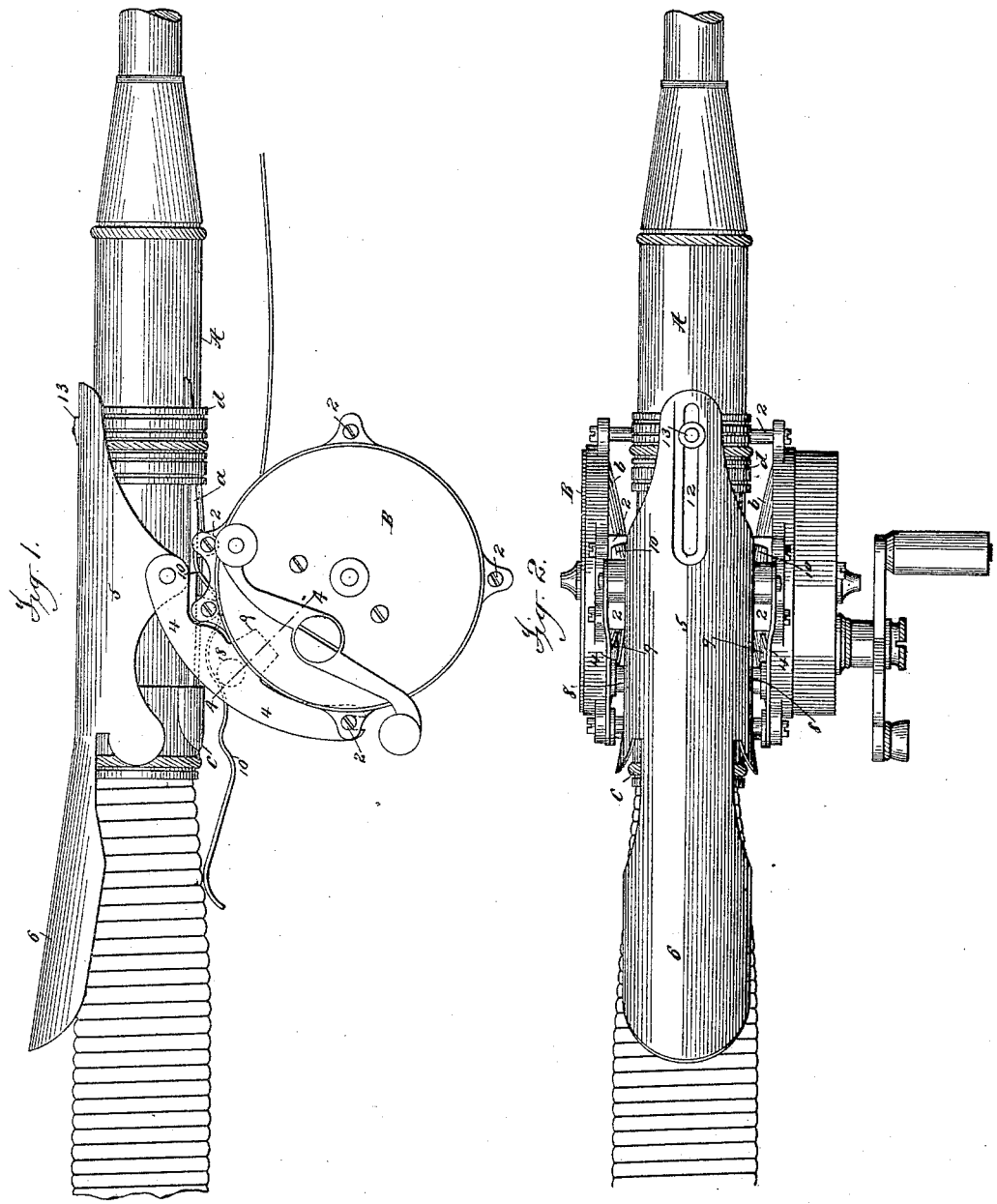

(No Model.) 2 Sheets—Sheet 2.
W. H. ATKINSON.
FISHING REEL ATTACHMENT.
No. 442,302. Patented Dec. 9, 1890.
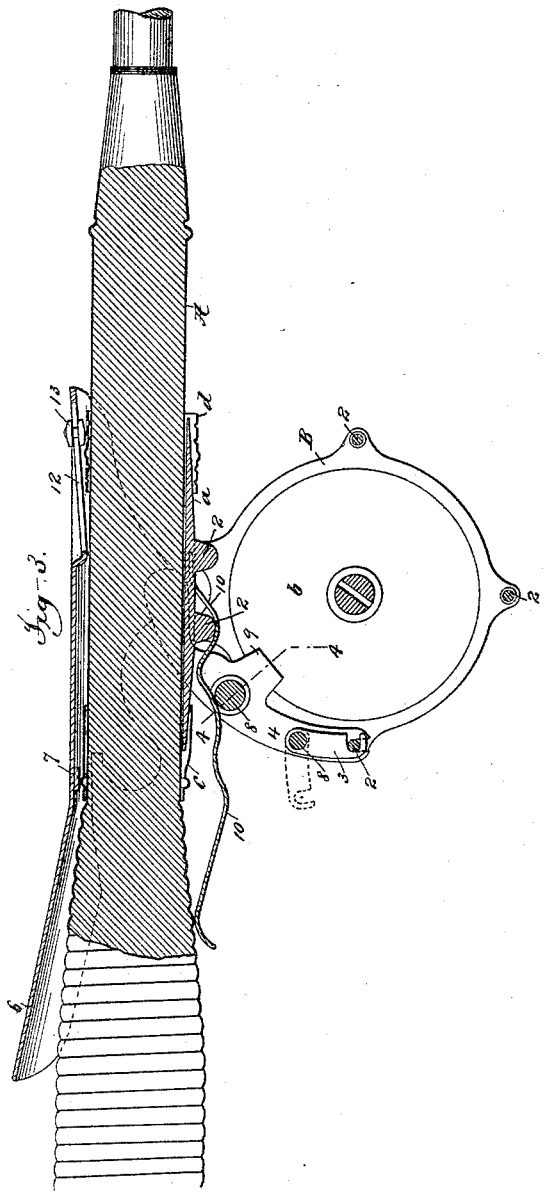
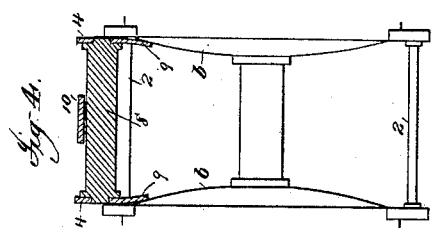
Attest:
Geo. H. Botts.
Inventor:
William H. Atkinson
By Philipp, Phelps & Hovey
Attys

UNITED STATES PATENT OFFICE.

WILLIAM H. ATKINSON, OF BROOKLYN, NEW YORK.

FISHING-REEL ATTACHMENT.

SPECIFICATION forming part of Letters Patent No. 442,302, dated December 9, 1890.

Application filed February 25, 1889. Renewed November 6, 1890. Serial No. 370,448. (No model.)

*To all whom it may concern:*

Be it known that I, WILLIAM H. ATKINSON, a citizen of the United States, residing at Brooklyn, county of Kings, and State of New York, have invented certain new and useful Improvements in Reel Attachments, fully described and represented in the following specification and the accompanying drawings, forming a part of the same.

This invention relates to an attachment for fishing-reels, the purpose of which is to provide a brake or drag which will normally operate with sufficient force to prevent the too free unwinding and "overrunning" of the line, but which is at the same time so under the control of the user that the amount of drag upon the reel can be instantly reduced to any desired extent or can be entirely removed and instantly restored to any desired extent, thereby permitting the user to have perfect control of the line to maintain it under any desired tension at all times while "playing" and landing a fish. When the reel is used upon the upper side of the rod, the unwinding and tension of the line are usually controlled by the thumb of the user, which is held against the coil of line with more or less force, as is required. This, however, is tiresome, and in playing and landing fish of large size the line is frequently unwound so rapidly as to burn the thumb of the user and sometimes to such an extent as to make it necessary to protect the thumb by a covering. Where the reel is used upon the under side of the rod, as is frequently the case, and as is always desirable at certain times, it becomes impracticable to control the unwinding and tension of the line by this means, and it has therefore in such cases been common to depend upon the ordinary permanent drag or brake with which many reels are provided to prevent the too free unwinding and overrunning of the line. Such brakes as these are not always sufficiently reliable for the purpose, and in all cases where they are depended upon the tension upon the line is necessarily maintained uniform, which is frequently undesirable.

The present invention aims to overcome these objections by providing a brake attachment for use in connection with ordinary forms of reels such as are now upon the market, and which can also be applied to reels specially constructed with reference to its application, by which the user will always have complete control of the unwinding of the line, allowing it to unwind more or less freely at different times, as may be required.

In order to convey a full understanding of the invention and the manner of its use, it will now be described in detail, reference being had to the accompanying drawings, in which—

Figure 1 is a side view of a portion of an ordinary fishing-rod, showing the same provided with a reel and the attachment constituting the present invention, the reel being arranged upon the under side of the rod. Fig. 2 is a top or plan view of the same. Fig. 3 is a longitudinal section of the same. Fig. 4 is a cross-section taken on the line 4 of Figs. 1 and 3, showing the reel in elevation.

Referring to said figures, it is to be understood that A represents the portion of an ordinary fishing-rod to which the reel is attached, and B a reel of any ordinary form, having a spool the ends $b$ of which fit within the frame of the reel in the usual manner. The reel is secured to the rod in the usual way by means of a base-piece $a$, one end of which is held by a stationary ferrule $c$ and the other end by a movable ferrule $d$. The frame of the reel is provided with the usual tie-rods 2, arranged in substantially the usual positions. Hinged upon the rear rod 2, and preferably secured thereon by latches 3, so as to be removable, are the ends of a pair of curved arms 4, which extend to opposite sides of the rod in about the position indicated in Figs. 1 and 3, where they are pivotally connected to a lever 5, which fits over and is curved away from the rod at its rear end, as indicated at 6, so as to form a fulcrum against the rod, by which when the end 6 of the lever is depressed its forward end will be rocked upward, and vice versa. For the purpose of forming a more pronounced fulcrum against the rod the inner side of the lever 5 may be provided with a rib or projection, as indicated at 7. The arms 4, which, as has been explained, are hinged to the lever 5 and to one of the tie-rods 2, are connected by one or more cross-bars 8, so as to form a rigid structure, and one or both of the arms are provided upon the under side with projections 9, which extend between the heads of the reel and are formed so as to bear against the ends $b$ of the spool, which are usually made convex, with sufficient force to put the maximum amount of resistance required upon the reel. For the purpose of moving the drag or brake thus formed in one direction, preferably to apply it, there is provided a spring 10, which is arranged in any suitable manner to normally press the arms 4 inward, so as to cause the projections 9 to press against the inner faces of the ends $b$ of the spool. This spring is preferably made of a thin strip of spring metal, and is arranged in the manner shown in Figs. 1 and 3, its forward end being bifurcated, so as to straddle the base-plate $a$ and rest above one of the tie-rods 2, the rearward extension of the spring passing beneath the adjacent tie-rod and above the cross-bar 8 of the arms 4. The rear end of the spring may also be extended so as to press against the rod. This, however, is not absolutely necessary, and, as before remarked, the spring may be of other forms than that shown.

The operation of the attachment thus organized is as follows: In using the rod with the reel and attachment arranged as described the user will naturally grasp the rod with his hand just in the rear of the rearward extension or finger-piece 6 of the lever 5 and in such position that his thumb naturally rests upon the finger-piece 6. So long as no pressure is applied to the finger-piece 6 the spring 10 will force the arms 4 inward, so that the projections 9 will press laterally against the convex ends of the spool, thereby applying friction to the spool to prevent the too free unwinding of the line, the amount of friction thus applied and the resulting drag upon the reel being determined by the strength of the spring. As the arms 4 are thus pressed inward their upper ends will depress the forward end of the lever 5 and raise the finger-piece 6, as indicated in the drawings. The spring will ordinarily be adjusted to such strength that it will hold the spool so as to prevent the line from unwinding during the operation of "casting" or trolling, but will not be sufficient in case of a sudden strain upon the line, as in the case of a "strike," to prevent the line from unwinding before it will be put under sufficient tension to endanger it or the rod. When it is desired to allow the line to unwind, or to reduce the tension upon it, so that it will unwind more freely—as, for example, in lengthening the line for a "cast" or for the purpose of allowing the line to run more freely after a fish is hooked—the user will simply press upon the finger-piece with more or less force, thereby rocking the lever 5 so as to raise the arms 4 and projections 9 against the tension of the spring 10 and reduce or entirely remove the pressure of the projections 9 upon the ends $b$ of the spool, and by this means absolute control of the reel is maintained by pressing to a greater or less extent upon the finger-piece, as may be required, and the tension upon the line can be instantly varied to any desired extent. In taking in the line the user will press upon the finger-piece so as to entirely remove the friction from the spool, and at the same time operate the crank of the reel with his other hand in the usual manner. The arms 4 may be permanently hinged to the tie-rod 2 or to the heads of the reel; but they will preferably be removably hinged, as shown, so that they can be removed and the reel used without the attachment, if desired. This also permits the attachment to be applied to any ordinary reel of suitable size to receive it. When the arms are detachably hinged, as shown, they can be removed and the attachment applied so as to use the reel upon the upper side of the rod when desired. To do this all that is necessary is to unhook and remove the arms 4, remove the spring 10, and reverse the reel, and then connect the arms 4 to the tie-rod upon the opposite side and reintroduce the spring. The lever 5 will then be upon the under side of the rod instead of the upper side, and the finger-piece 6, instead of being controlled by the thumb of the user, will be controlled by the forefinger in the same manner.

In some cases it will be desirable to permanently remove the brake from the reel, and for this purpose the lever 5 may be provided at its forward end with a depression having a longitudinal slot 12, in which slides the shank of a button 13, as indicated. When this provision is made, it is only necessary when it is desired to permanently remove the drag from the reel to rock the forward end of the lever 5 upward, so as to remove the drag, and then move the button 13 rearwardly, so as to bring it beneath the rearward end of the depression and retain the lever in its raised position.

What I claim is—

1. The combination, with a fishing rod and reel, of a brake arranged to be applied to the reel, and a lever connected to said brake to control it, said reel and lever being located when in position upon the rod upon opposite sides of the same, substantially as described.

2. The combination, with a fishing rod and reel, of a brake arranged to be applied to the reel, and a lever connected to said brake to control it, said lever being so formed as to be fulcrumed directly upon the rod by the application of the reel and lever to the rod, substantially as described.

3. The combination, with a fishing rod and reel, of a brake arranged to be applied to the reel, and a lever connected to said brake to control it, said reel and lever being located when in position upon the rod upon opposite sides of the same, and said lever being so formed as to be fulcrumed directly upon the rod by the passage into position of the latter between the reel and lever, substantially as described.

4. The combination, with a fishing-reel, of a brake arranged to be applied to the reel, a spring for moving said brake in one direction, and a lever connected to said brake to move it in the opposite direction, said reel and lever being located when in position upon the rod upon opposite sides of the same, substantially as described.

5. The combination, with a fishing rod and reel, of a brake for the reel, a spring for moving the brake in one direction, and a lever connected to said brake to move it in the opposite direction, said lever being fulcrumed directly upon the rod upon the side opposite the reel, substantially as described.

6. The combination, with a fishing rod and reel, of a brake arranged to be applied to the reel, and a lever for controlling said brake, provided with a button 13 and slot 12 for the adjustment of said lever into and out of operative position, substantially as described.

7. The combination, with the reel B, of the brake-arms 4, lever 5, controlling said brake, said brake-arms being each connected at one end to said lever and at the other to the reel, and latches 3 for locking said arms in operative position upon the reel, substantially as described.

In testimony whereof I have hereunto set my hand in the presence of two subscribing witnesses.

WILLIAM H. ATKINSON.

Witnesses:
J. J. KENNEDY,
GEO. H. BOTTS.